A. T. DAWSON & G. T. BUCKHAM.
FIRING GEAR OF BREACH LOADING ORDNANCE.
APPLICATION FILED JULY 15, 1909.
997,375.
Patented July 11, 1911.
4 SHEETS—SHEET 1.
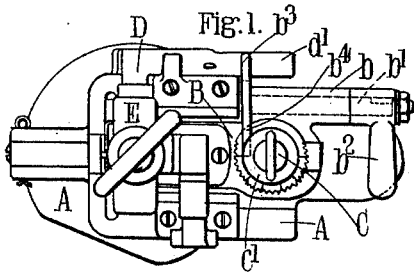
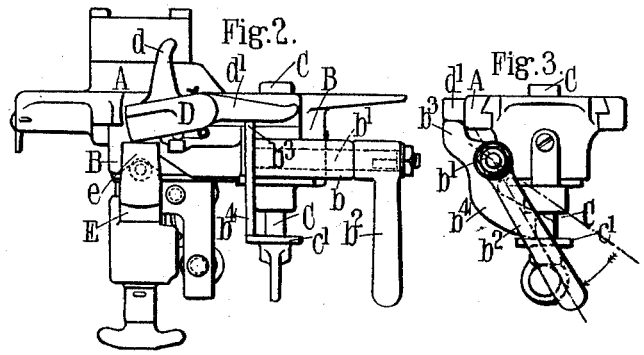
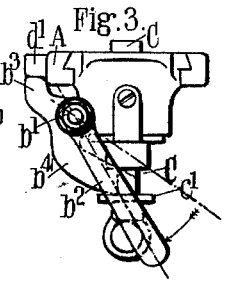
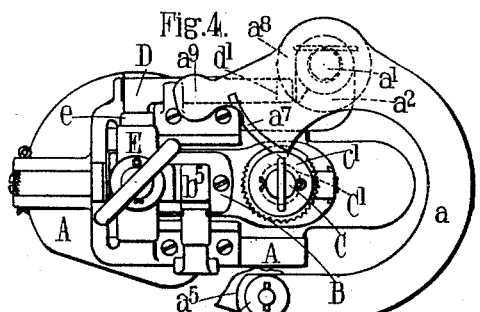
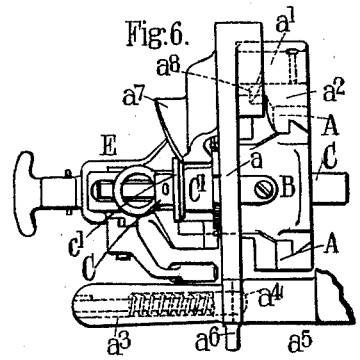
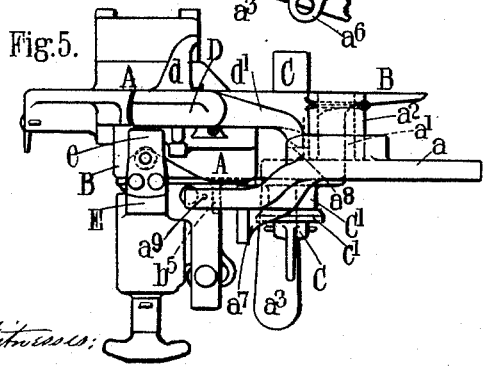

A. T. DAWSON & G. T. BUCKHAM.
FIRING GEAR OF BREACH LOADING ORDNANCE.
APPLICATION FILED JULY 15, 1909.
997,375.
Patented July 11, 1911.
4 SHEETS—SHEET 2.
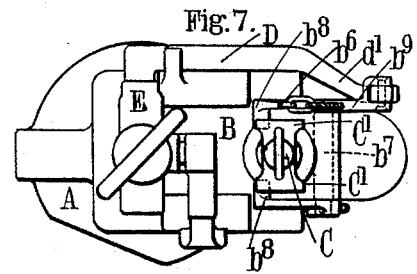
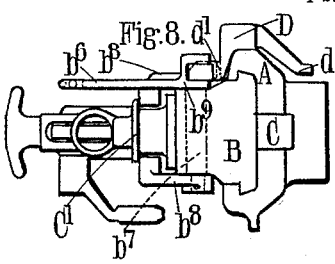
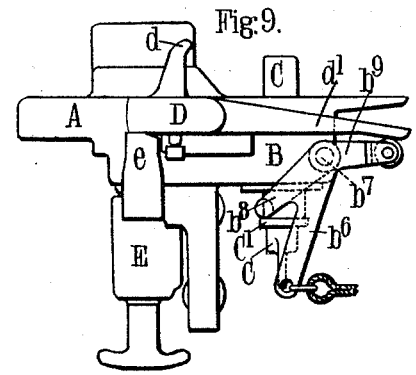
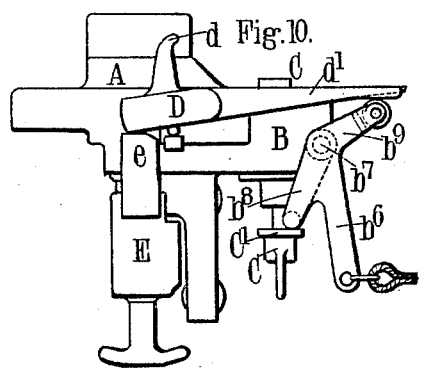
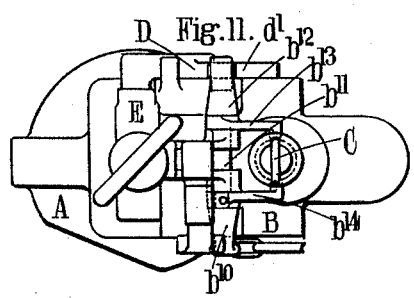
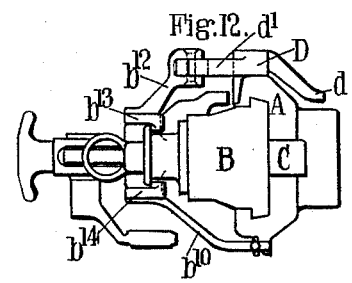
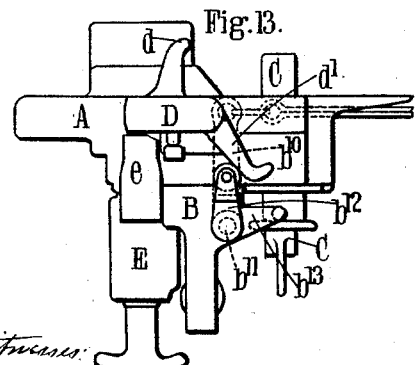
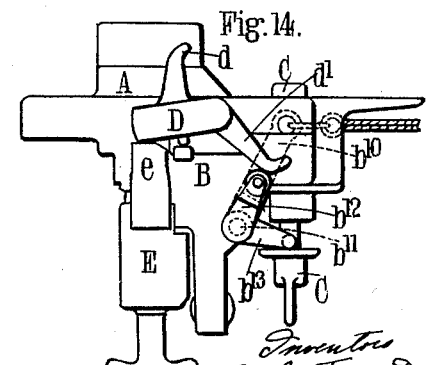

A. T. DAWSON & G. T. BUCKHAM.
FIRING GEAR OF BREACH LOADING ORDNANCE.
APPLICATION FILED JULY 15, 1909.
997,375.
Patented July 11, 1911.
4 SHEETS—SHEET 3.
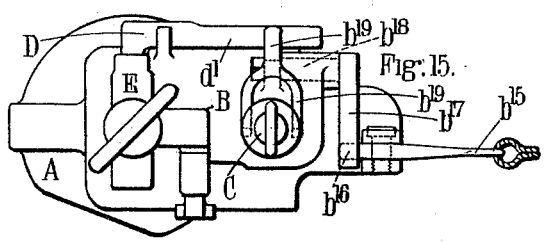
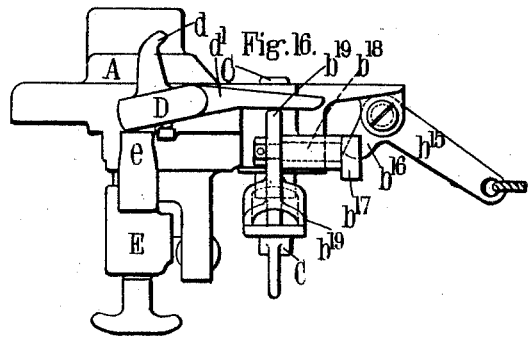
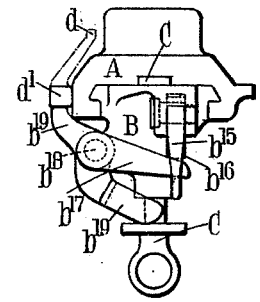
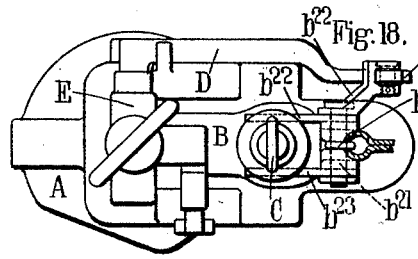
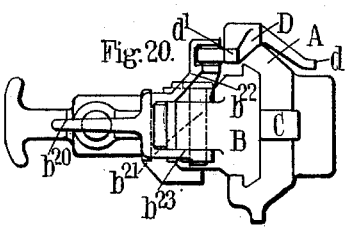
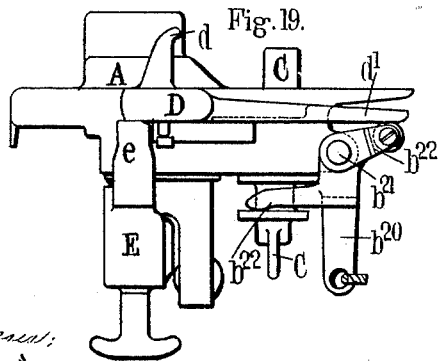

A. T. DAWSON & G. T. BUCKHAM.
FIRING GEAR OF BREACH LOADING ORDNANCE.
APPLICATION FILED JULY 15, 1909.
997,375.  Patented July 11, 1911.
4 SHEETS—SHEET 4.
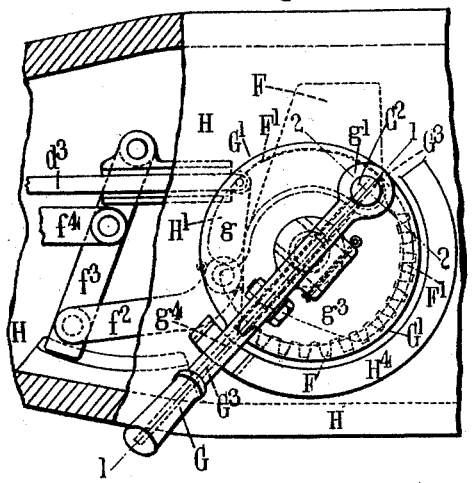
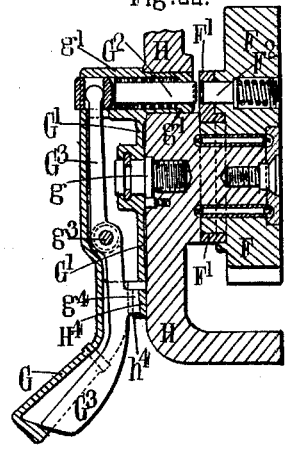
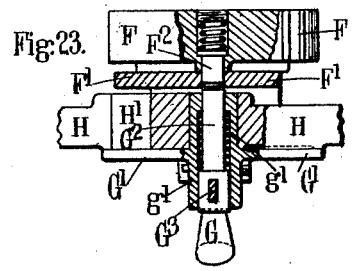

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS SONS & MAXIM, LIMITED, OF WESTMINSTER, ENGLAND.

FIRING-GEAR OF BREECH-LOADING ORDNANCE.

997,375.      Specification of Letters Patent.      Patented July 11, 1911.

Application filed July 15, 1909. Serial No. 507,697.

*To all whom it may concern:*

Be it known that we, ARTHUR TREVOR DAWSON and GEORGE THOMAS BUCKHAM, both subjects of the King of Great Britain, residing at 32 Victoria street, Westminster, in the county of London, England, have invented certain new and useful Improvements in the Firing-Gear of Breech-Loading Ordnance, of which the following is a specification.

This invention relates to the firing gear of breech loading ordnance of the kind in which there is a box slide and a lock laterally movable therein for opening and closing the cavity into and from which the vent sealing tube or primer is introduced and extracted.

The said invention is particularly intended for use with firing gear of the kind in which the striker or needle is adapted to be initially withdrawn by a retracting lever that receives its motion from the pinion crank of the breech mechanism prior to the lock or other parts being actuated. With firing gear of this kind, that is to say in which there is a lock laterally movable in a box slide, it is necessary, in the event of a miss fire occurring, to shift the lock into the open position in order to extract the vent sealing tube or primer and replace it by a fresh one. If during this operation the charge should explode owing to a hang fire there is a liability of the operator being injured by the unexpected recoil of the gun and the gases of explosion escaping through the open end of the axial vent. It has already been proposed to overcome this liability by providing a device for enabling the operator (when a miss fire occurs) to withdraw the lock from its firing position and renew the vent sealing tube without operating the breech actuating mechanism and while standing in a position of safety at one side of the gun so as to be out of the path of recoil should a hang fire take place. According to our invention the aforesaid device is of such a character that a handle or lever forming part of the said device and suitably disposed for enabling it to be actuated by the operator from preferably the right hand side of the gun, is so contrived and combined with appropriate mechanism that when actuated it will operate to initially retract the firing pin or striker, liberate the lock and move it into the withdrawn or open position for extracting the used primer and permitting the introduction of a fresh one, such operation being effected by the manipulation of the aforesaid handle or lever alone and without, as aforesaid, requiring the breech actuating mechanism to be actuated.

In order that our said invention may be clearly understood and readily carried into effect we will describe the same more fully with reference to the accompanying drawings, in which:—

Figure 1 is an elevation, Fig. 2 a plan, and Fig. 3 an end view as seen from the right of Fig. 2, showing one form of our improved device. Fig. 4 is an elevation. Fig. 5 a plan, and Fig. 6 an end view as seen from the right of Fig. 4, showing a modified form of our improved device. Fig. 7 is an elevation, and Fig. 8 an end view showing another modified form of our improved device. Figs. 9 and 10 are plan views of Fig. 7 showing the position of the parts prior and subsequent to the actuation of the said device. Figs. 11 to 14 are similar views to Figs. 7 to 10 showing another modified form of our improved device. Fig. 15 is an elevation, Fig. 16 a plan, and Fig. 17 an end view showing another modified form of our improved device. Figs. 18 to 20 are similar views to Figs. 15 to 17 showing another modified form of our improved device. Fig. 21 is a sectional elevation. Fig. 22 a vertical section taken approximately on the line 1.1. of Fig. 21, and Fig. 23 a transverse section taken approximately on the line 2—2 of Fig. 21, showing a further modified form of our improved device applied to the firing gear of heavy ordnance, the breech mechanism of which is intended to be operated by power-driven gearing.

Referring first more particularly to Figs. 1 to 20, A is the box slide, B the lock frame or casing and C the guide bolt which is carried by said casing and engages with the breech actuating mechanism in the usual manner for laterally moving the lock casing in the box slide when said mechanism is operated. D is the retracting lever which engages with the projection $e$ on the striker casing E for initially retracting the latter by a sliding bar that receives its motion from the crank pinion of the breech mechanism and operates upon a finger $d$ on the retracting lever in the known manner.

In the arrangement of our improved device shown by Figs. 1 to 3, the lock casing B is provided with a sleeve $b$ in which a spindle $b'$ is mounted with its axis lying transversely with respect to the axis of the striker casing E, the outer end of the said spindle being furnished with a lock actuating handle or lever $b^2$ and the inner end with a double lever $b^3$ $b^4$. The end $b^3$ of this double lever is adapted to bear against an arm $d'$ forming part of the striker retracting lever D and the other end $b^4$ is adapted to bear against a collar $c'$ formed on the guide bolt C by which the lock casing B is connected with the breech actuating mechanism in the usual manner. When the operator desires to withdraw the lock independently of the breech actuating mechanism, he stands on the right hand side of the gun and operates the aforesaid actuating handle $b^2$ in a direction shown by the arrow in Fig. 3, thereby causing the end $b^4$ of the said double lever to act upon the collar $c'$ and withdraw the guide bolt C and the end $b^3$ of the said lever to act upon the arm $d'$ of the striker retracting lever D and retract the striker or needle from the vent sealing tube. In Figs. 1 to 3 the parts are represented in this position. The lock can then be shifted into its open position by pulling on the said actuating handle $b^2$ toward the right, thus causing the extractor to eject the vent sealing tube which can then be replaced by a fresh one. The lock can then be pushed back and the parts returned to the firing position.

In the arrangement of our improved device shown by Figs. 4 to 6, we employ in place of the aforesaid transverse spindle, a longitudinal spindle $a'$ carried by a bracket $a^2$ on the box slide and furnished with a curved lever $a$ capable of moving in a plane transverse to the axis of the striker casing E, the curvature of the said lever being such that it will permit the movements of the lock casing to take place during the ordinary working of the breech mechanism without impediment by the said lever. One end of this curved lever has a handle $a^3$ which is provided with a self-acting spring catch $a^4$ that normally engages with a recess formed in a projection $a^5$ on the swinging carrier so as to retain the lever in a stationary position when not in use. In addition to the said handle $a^3$ the curved lever $a$ may be furnished with an eye $a^6$ for the reception of a lanyard if it is preferred to work the lever $a$ by that means. The said curved lever has a spiral cam $a^7$ which is adapted to bear against a collar $c'$ on the guide bolt C for retracting the latter. This curved lever is also provided with a spiral face $a^8$ on its boss for acting upon an arm $d'$ on the striker retracting lever D for causing the latter to retract the striker or needle. The end of the said curved lever opposite to that which carries the handle is provided with a projection or extension $a^9$, which, after the curved lever has operated to withdraw the guide bolt and retract the striker, is adapted to bear against the socket C' in which the guide bolt works and push the lock laterally in the box slide into its open position, thus causing the extractor to eject the vent sealing tube. During the return movement after a fresh vent sealing tube has been inserted in place, the said projection or extension $a^9$ in the curved lever bears against a projection $b^5$ on the lock and pushes it back again into the closed or firing position.

In the arrangement illustrated in Figs. 7 to 10 the device is actuated by a lanyard which is attached to a lever $b^6$ pivoted to the lock frame by an axis pin $b^7$. This lever has an arm $b^8$ which engages with the guide bolt C and operates the same through the collar C' thereof. The said lever also has an arm $b^9$ for actuating the arm $d'$ of the striker retracting lever D. When a pull is exerted on the lanyard the said lever $b^6$ is caused to turn about the axis of its pin $b^7$ and assume the position shown by Fig. 10 whereby the said guide bolt C is withdrawn. By a continued pull on the said lanyard the lock is shifted into its open position.

In the arrangement illustrated by Figs. 11 to 14, the device is also adapted to be actuated by a lanyard attached to a lever $b^{10}$ which is pivoted to the main spring case of the lock by an axis pin $b^{11}$. The said axis pin has secured thereto an arm $b^{12}$ at its upper end furnished with a roller for actuating the arm $d'$ of the striker retracting lever D. The withdrawal of the guide bolt C is effected by means of two arms $b^{13}$ $b^{14}$ that turn with the said axis pin $b^{11}$. The arm $b^{13}$ forms part of the arm $b^{12}$ and the arm $b^{13}$ forms part of the arm $b^{12}$ and the arm $b^{14}$ forms part of the lanyard lever $b^{10}$. When the lanyard lever $b^{10}$ is operated by the lanyard the parts assume the position shown by Fig. 14 and by a continued pull on the said lanyard the lock is shifted into its open position.

In the arrangement illustrated by Figs. 15 to 17, the lanyard is attached to a lever $b^{15}$ pivoted to the lock frame, the said lever being provided with a cam shaped arm $b^{16}$ arranged at right angles thereto. This cam shaped arm engages with the inner end of an intermediate lever $b^{17}$ carried by a horizontal axis pin $b^{18}$. Carried by this axis pin is another lever $b^{19}$ one end of which operates on the arm $d'$ of the striker retracting lever D and the other end of which engages with and operates to withdraw the guide bolt C.

In the arrangement illustrated by Figs. 18 to 20 the lanyard is attached to a lever $b^{20}$ pivoted to the lock frame by an axis pin $b^{21}$. The upper end of this axis pin has secured thereto a lever $b^{22}$ one end of which carries a roller that operates the arm $d'$ of the striker retracting lever D and the other end of which engages with the guide bolt C. The lower end of the said axis pin has secured thereto the arm $b^{23}$ which also engages with the said guide bolt.

In the arrangement illustrated by Figs. 21 to 23, we have shown our improved device applied to the breech mechanism instead of directly to the box slide and lock, such arrangement being more particularly intended for use with heavy guns. In this case the crank pinion F is provided with the cam plate F' for actuating the sliding bar $d^3$ that imparts motion to the aforesaid striker retracting lever D by acting upon the finger $d$ thereof for initially retracting the striker or needle. The said crank pinion is also provided with a link $f^2$ which is connected by means of a swinging arm or lever $f^3$ with the sliding bar $f^4$ for actuating the lock through the intervention of its guide bolt after the said cam plate F' has operated to initially retract the striker or needle as aforesaid. We make the said cam plate F' separate from the crank pinion F and so mount it thereon that in accordance with the position of a spring bolt $F^2$ or the like carried by the crank pinion it is capable of moving with the crank pinion or of moving independently thereof. During the ordinary working of the breech mechanism this cam plate F' remains locked to the crank pinion by the spring bolt $F^2$. This spring bolt is however so arranged relatively to a spring plunger $G^2$ or the like mounted in the swinging carrier H that by actuating a hand lever G the spring plunger can be caused to displace the spring bolt $F^2$ from its engagement with the cam plate F' and become itself engaged with the cam plate. The said cam plate can then by the angular displacement of the hand lever, be moved on the crank pinion F independently of the latter, thus causing the sliding bar $d^3$ to actuate the retracting lever to initially withdraw the striker or needle and also causing the link $f^4$ to actuate the guide bolt for shifting the lock laterally into its open position without actuating the breech mechanism. In the example illustrated, the said hand lever G lies lengthwise across the axis of the crank pinion and forms part of an angularly displaceable plate G' that is adapted to move about a pivot pin $g$ mounted on the front of the carrier H co-axial with respect to the axis of the said crank pinion. At the upper end of this hand lever (i. e. at the end remote from that which is grasped by the operator) and projecting inwardly from the angularly displaceable plate G' is a boss $g'$ containing the aforesaid spring plunger $G^2$. This plunger normally lies opposite the spring bolt $F^2$ that connects the cam plate F' to the crank pinion F. In the face of the carrier H and immediately behind the angularly displaceable plate G', is a segmental slot H' through which the said boss $g'$ of the angularly displaceable plate projects and in which it works when the hand lever G is moved around the axis of the said pin $g$. The hand lever is recessed or hollowed out to receive a plunger lever $G^3$ which is pivoted on a transverse axis pin $g^3$ on the said hand lever G and engages at its upper end with the said spring plunger $G^2$. This plunger lever also has a projection $g^4$ that engages with a slot $h^4$ (Fig. 22) formed in a segmental piece $H^4$ on the carrier and retains the hand lever in its normal position during the ordinary working of the breech mechanism.

When it is necessary to extract the vent sealing tube without actuating the breech mechanism, the aforesaid handle G and its plunger lever $G^3$ are grasped by the operator, whereby the plunger lever $G^3$ is moved about its transverse axis pin $g^3$ and causes the spring plunger $G^2$ to protrude inwardly from the angularly displaceable plate G'. In this movement of the spring plunger $G^2$ it pushes the spring bolt $F^2$ out of engagement with the cam plate F' and itself comes into engagement with the latter. By then angularly displacing the hand lever G and its plunger lever, the cam plate F' is turned about the axis of the crank pinion, thus causing the striker or needle to be initially retracted and the lock to be moved into its open position by the means above described. During this movement the spring plunger $G^2$ travels in the segmental slot H' and the spring bolt $F^2$ is held in its pushed back position by the cam plate F'. The spring plunger $G^2$ is held in its protruded position of engagement with the cam plate by the projection $g^4$ on the plunger lever $G^3$ bearing against the surface of the segmental piece $H^4$ on the carrier. When the hand lever G is angularly moved back again to its normal position, the said projection $g^4$ on the plunger lever $G^3$ reëngages with its recess $h^4$ in the segmental piece $H^4$, the spring plunger $G^2$ returns to its housed position in its boss $g'$ and the spring bolt $F^2$ reëngages with the cam plate F' and locks it to the crank pinion F, so that the said cam plate will move with the crank pinion when the breech mechanism is actuated in the ordinary manner.

What we claim and desire to secure by Letters Patent of the United States is:—

1. In firing gear for ordnance, the combination with a laterally movable lock frame adapted to be moved independently of the breech actuating mechanism, a striker, and a guide bolt mounted in said lock frame to engage with the breech actuating mechanism, of a lever operable from one side of the gun, and means whereby the said lever operates to retract the striker and withdraw the guide bolt.

2. In firing gear for ordnance, the combination with a laterally movable lock frame adapted to be moved independently of the breech actuating mechanism, a striker, and a guide bolt mounted in said lock frame to engage with the breech actuating mechanism, of a lever operable from one side of the gun, and means whereby the said lever operates to retract the striker, withdraw the guide bolt and move the lock frame laterally.

3. In firing gear for ordnance, the combination with a laterally movable lock frame adapted to be moved independently of the breech actuating mechanism, a striker, and a guide bolt mounted in said lock frame to engage with the breech actuating mechanism, of a striker-retracting lever, a lock actuating lever operable from one side of the gun and means whereby said lock actuating lever is adapted to operate the striker retracting lever and the guide bolt and to move the lock frame laterally.

4. In firing gear for ordnance, the combination with a laterally movable lock frame adapted to be moved independently of the breech actuating mechanism, a striker, and a guide bolt mounted in said lock frame to engage with the breech actuating mechanism, of a striker-retracting lever, a lock actuating lever operable from one side of the gun and devices adapted to engage with the striker retracting lever and the guide bolt and to be actuated by the lock actuating lever.

5. In firing gear for ordnance, the combination with a laterally movable lock frame adapted to be moved independently of the breech actuating mechanism, a striker, and a guide bolt mounted in said lock frame to engage with the breech actuating mechanism, of a striker actuating lever, a lock actuating lever operable from one side of the gun, an axle carrying said lock actuating lever and devices for engaging with the striker retracting lever and the guide bolt.

6. In firing gear for ordnance, the combination with the laterally movable lock frame adapted to be moved independently of the breech actuating mechanism, and the striker and guide bolt mounted in said lock frame, of a lock actuating lever pivoted to the lock frame, and means integral with the said lever for retracting the striker and withdrawing the guide bolt so that a continued pull on the said lock actuating lever causes the lock frame to move laterally to the open position.

7. In firing gear for ordnance, the combination with the laterally movable lock frame adapted to be moved independently of the breech actuating mechanism, and the striker and guide bolt mounted in said lock frame, of a lock actuating lever pivoted to the lock frame, an arm integral with the said lever for retracting the striker, and a second arm integral with the lock actuating lever for operating on the guide bolt to withdraw it.

8. In firing gear for ordnance, the combination with the laterally movable lock frame adapted to be moved independently of the breech actuating mechanism, and the striker and guide bolt mounted in said lock frame, of a lock actuating lever pivoted to the lock frame, a striker retracting lever, an arm integral with said lock actuating lever in contact with the retracting lever, a collar on the guide bolt and a second arm integral with the lock actuating lever in contact with the said collar.

In testimony whereof we affix our signatures in presence of two witnesses.

ARTHUR TREVOR DAWSON.
GEORGE THOMAS BUCKHAM.

Witnesses:
  HENRY KING,
  ALFRED PEAKS.

Copies of this patent may be obtained for five cents each, by addressing the "Commissioner of Patents, Washington, D. C."